United States Patent
Duggirala et al.

(10) Patent No.: US 8,799,194 B2
(45) Date of Patent: Aug. 5, 2014

(54) PROBABILISTIC MODEL CHECKING OF SYSTEMS WITH RANGED PROBABILITIES

(71) Applicant: NEC Laboratories America, Inc., Princeton, NJ (US)

(72) Inventors: Parasara Sridhar Duggirala, Champaign, IL (US); Khalil Ghorbal, Pittsburgh, PA (US); Franjo Ivancic, Princeton, NJ (US); Vineet Kahlon, Princeton, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 161 days.

(21) Appl. No.: 13/646,377

(22) Filed: Oct. 5, 2012

(65) Prior Publication Data

US 2013/0091080 A1    Apr. 11, 2013

Related U.S. Application Data

(60) Provisional application No. 61/543,839, filed on Oct. 6, 2011, provisional application No. 61/546,759, filed on Oct. 13, 2011.

(51) Int. Cl.
*G06N 7/00* (2006.01)
*G06N 99/00* (2010.01)

(52) U.S. Cl.
CPC .............. *G06N 7/005* (2013.01); *G06N 99/005* (2013.01); *G06N 7/00* (2013.01)
USPC ............................................ 706/12; 706/45

(58) Field of Classification Search
None
See application file for complete search history.

(56) References Cited

PUBLICATIONS

Boyd, et al., Fastest Mixing Markov Chain on a Graph, SIAM Review, vol. 46, No. 4, 2004, pp. 667-689.*

Borges, M., et al. "Symbolic Execution With Interval Solving and Meta-Heuristic Search" 2012 IEEE Fifth International Conference on Software Testing, Verification and Validation. Apr. 2012. pp. 111-120.

Forejt, V., et al. "Automated Verification Techniques for Probabilistic Systems" Formal Methods for Eternal Networked Software Systems—11th International School on Formal Methods for the Design of Computer, Communication and Software Systems, SFM 2011. Jun. 2011. pp. 1-60.

Gao, S., et al. "Integrating ICP and LRA Solvers for Deciding Non-linear Real Arithmetic Problems" Proceedings of 10th International Conference on Formal Methods in Computer-Aided Design, FMCAD 2010. Oct. 2010. pp. 81-89.

Godefroid, P., et al. "DART: Directed Automated Random Testing" Hardware and Software: Verification and Testing—5th International Haifa Verification Conference, HVC 2009. Oct. 2009. (11 Pages).

Majumdar, R., et al. "Hybrid Concolic Testing" 29th International Conference on Software Engineering (ICSE 2007). May 2007. pp. 416-426.

(Continued)

*Primary Examiner* — Wilbert L Starks
(74) *Attorney, Agent, or Firm* — Joseph Kolodka

(57) ABSTRACT

Systems and methods for model checking of live systems are shown that include learning an interval discrete-time Markov chain (IDTMC) model of a deployed system from system logs; and checking the IDTMC model with a processor to determine a probability of violating one or more probabilistic safety properties. Checking the IDTMC model includes calculating a linear part exactly using affine arithmetic; and over-approximating a non-linear part using interval arithmetic.

10 Claims, 3 Drawing Sheets

(56) References Cited

PUBLICATIONS

Pacheco, C., et al. "ECLAT: Automatic Generation and Classification of Test Inputs" ECOOP 2005—Object-Oriented Programming, 19th European Conference. Jul. 2005. pp. 504-527.

Pacheco, C., et. "Feedback-Directed Random Test Generation" 29th International Conference on Software Engineering (ICSE 2007). May 2007. pp. 1-10.

Pacheco, C., et. "Randoop: Feedback-Directed Random Testing for Java" Companion to the 22nd Annual ACM SIGPLAN Conference on Object-Oriented Programming, Systems, Languages, and Applications, OOPSLA 2007, Oct. 2007, pp. 815-816.

Sen, K., et al. "CUTE: A Concolic Unit Testing Engine for C" Proceedings of the 10th European Software Engineering Conference held jointly with 13th ACM SIGSOFT International Symposium on Foundations of Software Engineering. Sep. 2005. pp. 263-272.

Sen, K., et al. "Learning Continuous Time Markov Chains From Sample Executions" 1st International Conference on Quantitative Evaluation of Systems (QEST 2004). Sep. 2004. pp. 1-10.

Sen, K., et al. "Model-Checking Markov Chains in the Presence of Uncertainties" Tools and Algorithms for the Construction and Analysis of Systems, 12th International Conference, TACAS 2006 Held as Part of the Joint European Conferences on Theory and Practice of Software, ETAPS 2006. Mar. 2006. pp. 1-22.

Souza, M., et al. "Coral: Solving Complex Constraints for Symbolic Pathfinder" NASA Formal Methods—Third International Symposium, NFM 2011. Apr. 2011. pp. 359-374.

Xie, T., et al. "Symstra: A Framework for Generating Object-Oriented Unit Tests Using Symbolic Execution" Tools and Algorithms for the Construction and Analysis of Systems, 11th International Conference, TACAS 2005, Held as Part of the Joint European Conferences on Theory and Practice of Software, ETAPS 2005. Apr. 2005. pp. 365-381.

Younes, H., et al. "Numerical vs. Statistical Probabilistic Model Checking" International Journal on Software Tools for Technology Transfer (STTT), vol. 8, No. 3, Jun. 2006. pp. 1-14.

Younes, H. "Probabilistic Verification for "Black-Box" Systems" Computer Aided Verification, 17th Internatinonal Conference, CAV 2005. Jul. 2005. pp. 253-265.

\* cited by examiner

PROBABILISTIC MODEL CHECKING OF SYSTEMS WITH RANGED PROBABILITIES

RELATED APPLICATION INFORMATION

This application claims priority to provisional application Ser. No. 61/543,839 filed on Oct. 6, 2011, incorporated herein by reference. This application also claims priority to provisional application Ser. No. 61/546,759 filed on Oct. 13, 2011, incorporated herein by reference.

BACKGROUND

1. Technical Field

The present invention relates to software analysis and, more particularly, to verifying a safety reachability property in already-deployed systems.

2. Description of the Related Art

Analyzing the runtime behavior of large scale computer systems is challenging due to the lack of availability of accurate models describing the structure and behavior of such systems. Even when models exist, they usually pertain to an old configuration of the system and do not include all changes made after the system was deployed and tuned. Moreover, it is often hard to get access to the actual system to carry out such modeling/analysis. Typically all one has access to is system logs and traces.

Hidden Markov models have been extracted from a given set of logs using a variety of extant techniques. However, existing techniques mainly infer one Markov model which assigns concrete probabilities to transitions of the model. Realistically speaking, however, it is very difficult to deduce a precise Markov model from only a finite set of systems logs, as the deduced probabilities will have uncertainties which existing techniques fail to take into account.

SUMMARY

A method for model checking of deployed systems is shown that includes learning an interval discrete-time Markov chain (IDTMC) model of a deployed system from system logs; and checking the IDTMC model with a processor to determine a probability of violating one or more probabilistic safety properties. Checking the IDTMC model includes splitting the probability into a linear part and a non-linear part; calculating the linear part exactly using affine arithmetic; and over-approximating the non-linear part using interval arithmetic.

A system for model checking of deployed systems is shown that includes a model learning module configured to learn an interval discrete-time Markov chain (IDTMC) model of a deployed system from system logs; and a processor configured to checking the IDTMC model to determine a probability of violating one or more probabilistic safety properties, wherein the probability is split into a linear part and a non-linear part. The processor includes an affine module configured to calculate the linear part exactly using affine arithmetic and an interval module configured to over-approximate the non-linear part using interval arithmetic.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide verification of probabilistic safety properties on already-deployed systems in two steps: learning an interval discrete time Markov chain (IDTMC) from system logs and analyzing the IDTMC model for quantitative and reliability properties.

Figure 1:
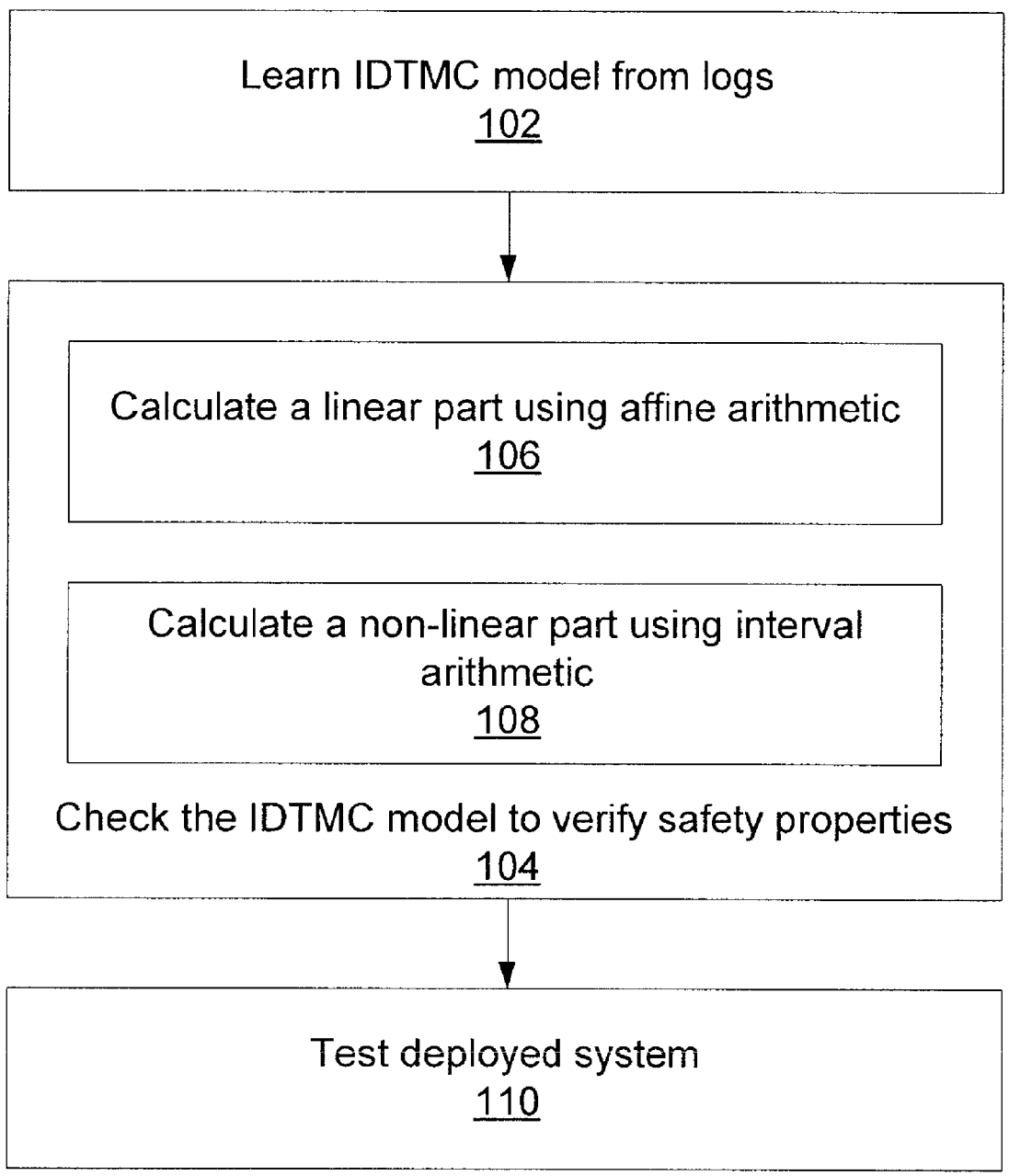
FIG. 1 is a block/flow diagram of checking safety properties of a deployed system using interval discrete-time Markov chain (IDTMC) models according to the present principles.

Referring now to FIG. 1, a high-level overview of an embodiment of the present principles is shown. Block 102 assumes errors to have a normal distribution and generates an IDTMC model from a set of runtime system logs using, e.g., bootstrapping. This allows measurement of confidence in the probabilistic model. The IDTMC may be interpreted as representing infinitely many discrete time Markov chains (DTMCs) over an interval of parameters. Each DTMC represents a set of probabilities for transferring from one system state to each other system state. IDTMCs are classical discrete-time Markov chains with ranged probabilities, where transition between two states is associated with an interval in which the actual transition probability must lie. An IDTMC may be generated as a set of Gaussian distributions, centered around a mean probability for each transition, having a width that is determined by the range of probabilities included in the interval.

The model is then checked to establish whether it meets safety properties in block 104 by computing a sound over-approximation of the probability to reach a desired state. To accomplish this, block 104 and splits an IDTMC transition interval probability matrix P into a central transition probability matrix $P_c$ and an interval matrix E over affine arithmetic error terms that encode the uncertainty of the original transition interval probability matrix P. The central matrix $P_c$ is built using the centers of the original intervals of P, determined as the means given by the underlying learning method used. Computation may then be split into a constant value c, a linear part over affine error terms l(e), and a remaining non-linear part. Block 106 computes the linear part using affine arithmetic, producing error bounds for computing the probability of satisfying a given property. Affine arithmetic is used in block 106 to overcome the loss of precision that would result from employing interval arithmetic across the board. Affine arithmetic overcomes the loss of relations in interval arithmetic. This allows precise computation of first-order terms.

Block 108 exploits the error bounds using interval arithmetic to compute the non-linear part. Block 110 then tests the deployed system using the formal analysis, where the above-described over-approximation may be computed in polynomial time and provides confidence metrics in the results. The model checking of block 104 finds probabilities of failure in the system. If a probability of a problem is high enough to cause concern, block 110 implements a set of conditions to replicate the circumstances predicted by the model to cause the problem.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Embodiments described herein may be entirely hardware, entirely software or including both hardware and software elements. In a preferred embodiment, the present invention is implemented in software, which includes but is not limited to firmware, resident software, microcode, etc.

Figure 2:
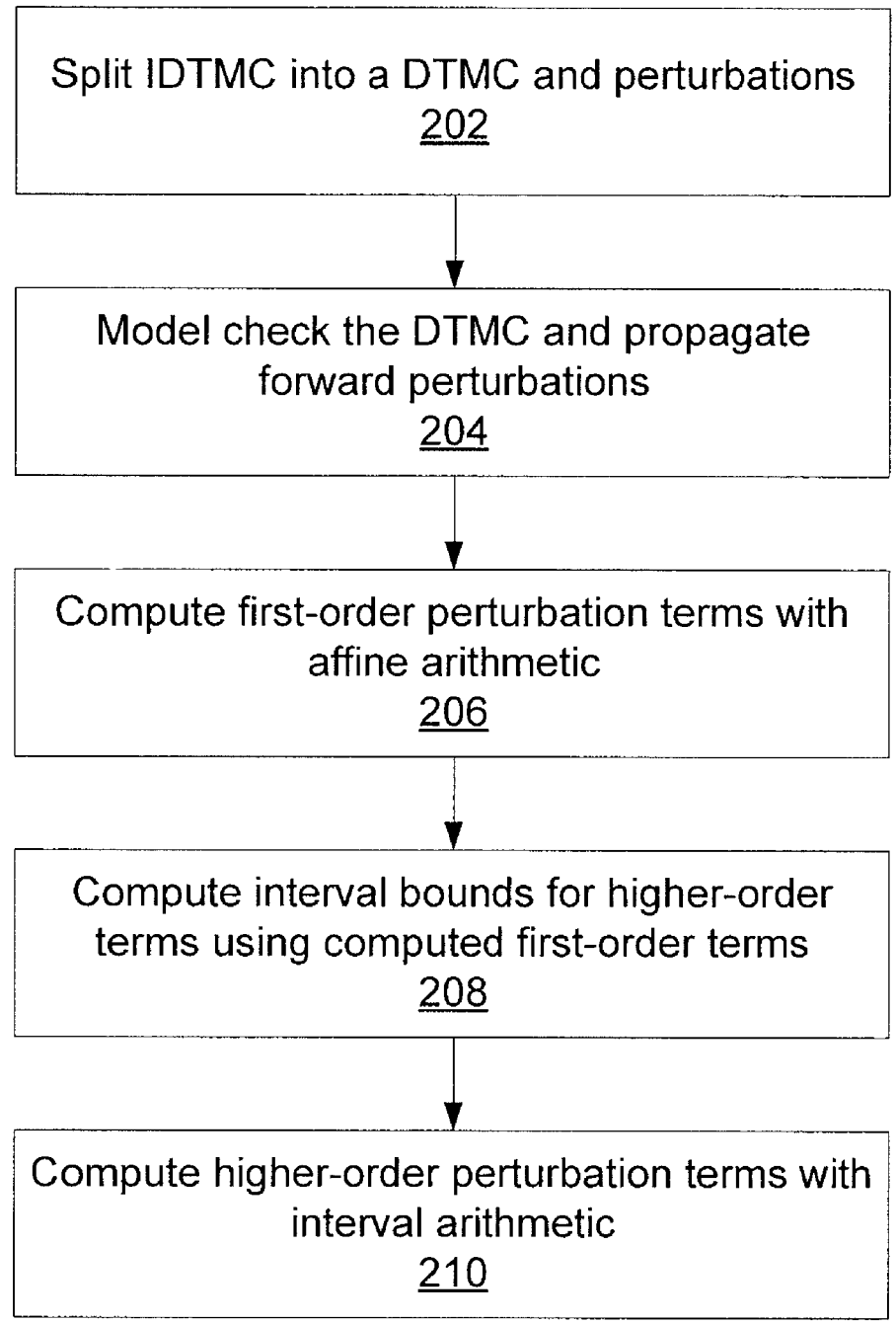
FIG. 2 is a block/flow diagram of splitting an IDTMC model into linear and non-linear parts according to the present principles.

Referring now to FIG. 2, greater detail is provided regarding checking the IDTMC model. Block 202 splits the IDTMC into a DTMC and a set of perturbations. Block 204 does model checking on the DTMC, which may include a bounded or unbounded evaluation of the model to determine whether the model satisfies a given property. Block 204 propagates perturbations from the DTMC forward with each iteration. If interval arithmetic were used at this point, the loss of precision would compound at each iteration. Instead, affine arithmetic is used in block 206 to compute first-order perturbation terms exactly. Block 208 uses the results from the first-order terms to compute interval bounds for the higher-order terms. Non-linear terms are computed in block 210, where interval arithmetic over-approximates the results. This computation needs an envelope for the linear terms using interval bounds, which may be characterized as a weighted median problem—this allows for linear time execution over the non-linear perturbation terms.

A DTMC may be defined as a 4-yuple: $M \equiv (S, s_0, P, l)$, where S is a finite set of states, $s_0 \in S$ is the initial state, P is a stochastic matrix, and $l: S \to 2^{AP}$ is a labeling function which assigns to each state $s \in S$ a set of atomic propositions $\alpha \in AP$ that are valid in s, and AP denotes a finite set of atomic propositions. The element $p_{ij}$ of the square matrix P denotes the transition probability from state $s_i$, to state $s_j$. Therefore, $p_{ij} \in [0,1]$ and for all i, $\Sigma_j p_{ij} = 1$. An IDTMC may then be defined as a 4-tuple $M_I \equiv (S, s_i, P_I, l)$, where $P_I$ is an interval valued matrix. The IDTMC may further be defined as a set of DTMCs, where each stochastic matrix P can be found in the interval matrix $P_I$. Model checking a stochastic property then means computing the set:

$$\{P | P = \text{Prob}_M(s, \Psi), \forall M \in M_I\}.$$

The set of states may be split into those having definite probabilities, either of 1 or of 0, and those which are uncertain. The probabilities may be expressed as a vector $v_k$, where the elements of the vector are the probabilities $\text{Prob}_M(s_i, \Psi, k)$ that a path of length k, starting from a state $s_i$ satisfies the property $\Psi$. This vector may be defined recursively as $v_k = P'v_{(k-1)} + b$, where P' is a square matrix extracted from the transition probability matrix P by removing all the rows i such that $s_i$ has a definite probability of 1 or 0. The components of the vector b may be defined as $$b_i = \sum_{j \notin I_{maybe}} p_{ij} v_{(k-1)}[j],$$

where $I_{maybe}$ is the set of indices corresponding to states having uncertain probabilities and $v_k[j]$ is the $j^{th}$ element of the vector $v_k$.

In the bounded case, where $k < +\infty$, the recursion may be unrolled completely, starting with $v_0 = 0$. The probability that a path of length zero satisfies the property $\Psi$ is defined to be zero for all states of uncertain probability. To solve the unbounded case, the system of linear equations $v = P'v + b$ is resolved.

Solving the bounded case involves computing the n objective values of the following linear programming problems:

$$\max/\min \sum_{1 \le i, j \le n} \alpha_{ij} \varepsilon_{ij}$$

such that $-e_{ij} \le \varepsilon_{ij} \le e_{ij}$, $1 \le i, j \le n$ $$\sum_{j=1}^{n} \varepsilon_{ij} = 0, 1 \le i \le n,$$

where each $\epsilon_{ij}$ is an interval component of an interval matrix E that represents the uncertainty of the model. The interval components $\epsilon_{ij}$ are bounded on each side by an interval $e_{ij}$. The coefficients $\alpha_{ij}$ represent error weights of the symbolic error variables $\epsilon_{ij}$. Any appropriate linear programming solver can solve the above problems. However, a particularly efficient method for solving the present linear programming problem is shown hereinbelow.

The linear programming problem above can be decomposed into n smaller problems of the form:

$$\max/\min \sum_{1 \le i \le n} \alpha_i \varepsilon_i$$

such that $-e_i \le \varepsilon_i \le e_i$, $1 \le i \le n$ $$\sum_{i=1}^{n} \varepsilon_i = 0,$$

with $\epsilon_i \equiv [-e_i, e_i]$. For a feasible tuple $(\epsilon_1, \ldots, \epsilon_n)$, $\epsilon_i$ is said to be positively or negatively saturated accordingly as $\epsilon_1$ equals $-e_i$ or $e_i$. Exploiting the fact that there always exists a maximizing feasible solution that saturates all but possibly one variable, the maximization problem reduces to determining the variables that need to be saturated positively and the ones that need to be saturated negatively which, in turn, automatically determines the values assigned to all the variables $\epsilon_1$. This reduces to an instance of the weighted median problem, solvable in linear time.

In the unbounded case, the solution can similarly be reduced to the solution of a system of interval linear equations. Analytical solvability of such a system is NP-hard, but numerical techniques may be used to approximate the set of solutions to efficiently solve the problem.

Figure 3:
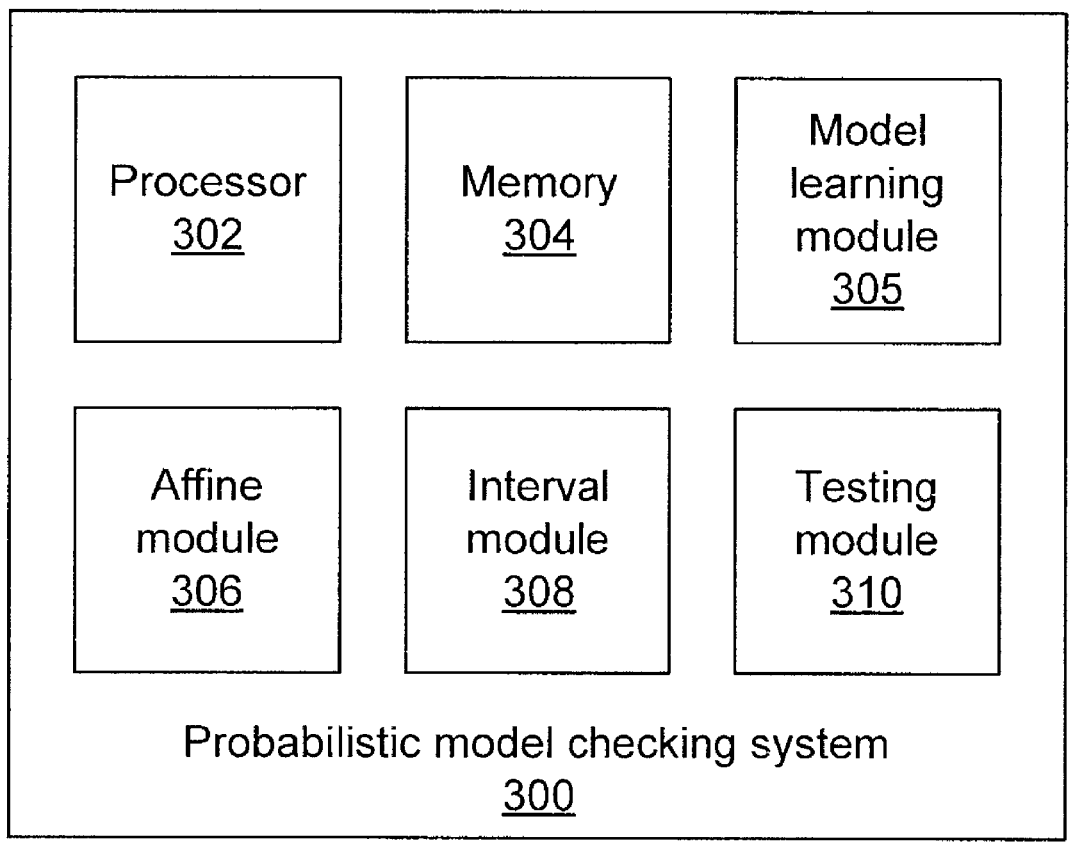
FIG. 3 is a system for checking probabilistic safety properties of a deployed system using IDTMC models according to the present principles.

Referring now to FIG. 3, a probabilistic model checking system 300 is shown. The system 300 includes a processor 302 and memory 304. A model learning module 305 learns an IDTMC module from a set of system logs from a deployed system. The IDTMC model is split into a linear part and a non-linear part by the processor 302. The affine module 306 calculates the linear part exactly using affine arithmetic, while the interval module 308 over-approximates the non-linear part using interval arithmetic. This produces a set of probabilities indicating the likelihood that particular states will lead to the violation of particular safety properties. Testing module 310 tests the deployed system by setting parameters that match the states that lead to particular safety property violations.

Having described preferred embodiments of a system and method for probabilistic model checking of systems with ranged probabilities (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for model checking of deployed systems, comprising:
    learning an interval discrete-time Markov chain (IDTMC) model of a deployed system from system logs; and
    checking the IDTMC model with a processor to determine a probability of violating one or more probabilistic safety properties, comprising:
        splitting the probability into a linear part and a non-linear part; and
        calculating the linear part exactly using affine arithmetic; and
        over-approximating the non-linear part using interval arithmetic.

2. The method of claim 1, further comprising testing the deployed system to determine whether a given probabilistic safety property is violated based on the probability of violating the given probabilistic safety property.

3. The method of claim 2, wherein checking the IDTMC model further comprises checking the DTMC model and propagating forward the perturbations.

4. The method of claim 1, wherein checking the IDTMC model further comprises splitting the IDTMC into a discrete-time Markov chain (DTMC) model and perturbations.

5. The method of claim 1, wherein checking the IDTMC model further comprises computing interval bounds for the non-linear part using the calculated linear part.

6. The method of claim 5, wherein computing interval bounds for the non-linear part comprises solving a set of linear programming problems.

7. The method of claim 6, wherein computing interval bounds for the non-linear part comprises reformulating the set of linear programming problems as a weighted median problem.

8. The method of claim 1, wherein the one or more probabilistic safety properties include a bounded property.

9. The method of claim 1, wherein the one or more probabilistic safety properties include an unbounded property.

10. A system for model checking of deployed systems, comprising:
    a model learning module configured to learn an interval discrete-time Markov chain (IDTMC) model of a deployed system from system logs; and
    a processor configured to check the IDTMC model to determine a probability of violating one or more probabilistic safety properties, wherein the probability is split into a linear part and a non-linear part, comprising:
        an affine module configured to calculate a linear part exactly using affine arithmetic; and
        an interval module configured to over-approximate a non-linear part using interval arithmetic.

* * * * *